Nov. 3, 1959 E. ATTI ET AL 2,911,563

ELECTROSTATIC LENS AND DEFLECTION SYSTEM

Filed April 24, 1957 6 Sheets-Sheet 1

WITNESSES:
Bernard R. Gieguey
Leon M. Garman

INVENTORS
Eros Atti and
James A. Hall.
BY Charles F. Renz
ATTORNEY

ELECTROSTATIC LENS AND DEFLECTION SYSTEM

Filed April 24, 1957 6 Sheets-Sheet 2

ELECTROSTATIC LENS AND DEFLECTION SYSTEM

Filed April 24, 1957

Nov. 3, 1959 E. ATTI ET AL 2,911,563

ELECTROSTATIC LENS AND DEFLECTION SYSTEM

Filed April 24, 1957 6 Sheets-Sheet 5

Nov. 3, 1959                E. ATTI ET AL                2,911,563
                ELECTROSTATIC LENS AND DEFLECTION SYSTEM
Filed April 24, 1957                              6 Sheets-Sheet 6

2,911,563

ELECTROSTATIC LENS AND DEFLECTION SYSTEM

Eros Atti, Breeseport, and James A. Hall, Elmira, N.Y., assignors to Westinghouse Electric Corporation, East Pittsburgh, Pa., a corporation of Pennsylvania Application April 24, 1957, Serial No. 654,756

10 Claims. (Cl. 315—17)

This invention relates to apparatus for focusing and deflection of electrically charged particles and more particularly to a novel type of charged particle optical device wherein said focusing and deflection action occurs in the same space.

According to standard practice, conventional focusing and deflection systems are arranged in such a manner that the deflection of charged particle beam follows the focusing action in the system. Furthermore, in order to prevent intolerable defocusing effects, the deflection electrodes must be biased at an average potential substantially equal to the potential applied to the electrode of the lens which is adjacent the deflection electrodes. This usually requires a considerably longer particle beam structure than would be required for the beam forming and focusing structure alone, and often requires inconveniently large voltage differences between the deflection electrode leads and the leads to other electrodes in the structure.

It has been suggested that the deflection electrodes be placed in a field-free region before the principal bipotential focusing lens to avoid formation of a distorting electron optical lens. The deflection electrodes may also serve as the first cylinder in a bipotential lens. In this type of device, the deflecting electrodes must, on the average, be biased to the lower potential of the bipotential lens, usually 15% to 25% of the final anode potential. The quality of the focus suffers as the beam is first deflected and it then passes through the lens off axis and is adversely affected by lens aberrations.

In our invention the above-mentioned restrictive conditions cease to exist because the deflection system is within the same space occupied by the focusing lens itself and the bias at which the deflection electrodes operate may be quite different from the potential of the final electrode of the lens system. Our system in certain embodiments even permits the deflection electrodes to be biased at a potential equal to or substantially below the potential of the particle emitting electrode. Such a biasing potential would not be possible using conventional focusing lens and deflection systems because, even neglecting the resulting intolerable defocusing effect, most of the charged particles would be reflected back towards the focusing lens. Because deflection and focusing in our system occur in the same space, the beam is never far from the axis of the lens and useful deflections may be produced with essentially no reduction in the quality of focus.

In our system the lens system performs the two independent functions of focusing and deflection of charged particles and may be considered to constitute a dual purpose lens. The system provides interesting possibilities in the field of charged particle optical devices especially in those cases in which the focused beam of charged particles must be submitted to small amplitude deflections. The system allows the use of a simple electron gun structure, simpler and less expensive electron tubes, and simplified circuitry.

A typical example in which use is made of small amplitude deflections may be found in U.S. Patent 2,849,648 issued August 26, 1958, entitled "Television Apparatus" by F. T. Thompson, and assigned to the same assignee. U.S. Patent 2,849,648 describes a cathode ray display system in which an auxiliary vertical deflection is impressed on the electron beam of the cathode ray tube in order to reduce or eliminate line structure from the conventional scan raster of a television display. Another typical example of the use of small amplitude deflections may be found in color television tubes wherein the sensing signal principle is utilized. As is well known, in such tubes, it is desired that the electron beam be accurately registered with a pattern of narrow phosphor strips. Beam position correction may be effected by means of small amplitude beam deflection. There are many other obvious applications.

It is accordingly an object of our invention to provide an improved electrostatic focusing and deflection system for charged particles.

It is another object to provide an electrostatic focusing and deflection system in which the focusing and the deflection of electrically charged particles occurs in the same space.

It is another object to provide an electrostatic focusing and deflection system wherein all or part of the focusing electrodes of the system perform also the functions of deflection electrodes.

It is still another object to provide an electrostatic focusing and deflection system, wherein the deflection system does not require a bias of substantially the same as that of the electrode of the focusing system adjacent to the deflection system, as required by the presently known electrostatic focusing and deflection systems.

Another object is to provide an electrostatic focusing and deflection system wherein the location of the deflection system with respect to the focusing system offers greater degree of freedom than available in the present conventional electrostatic focusing and deflection systems.

It is another object to provide an electrostatic focusing and deflection system wherein the deflection system can be biased at cathode potential to permit the deflection of high potential beams by means of deflection electrodes operating at low potential.

It is still another object to provide an electrostatic focusing and deflection system which will permit deflection of a beam by means of deflection electrodes operating at a potential considerably below cathode potential.

Another object is to provide a focusing and deflection system which is much more simple and compact than the conventional electrostatic focusing and deflection systems available at present.

It is another object to provide an improved type of focusing electrode system utilizing an einzel type lens capable of focusing and deflecting charged particles.

It is another object to provide an improved type of focusing electrode system utilizing a lens of the bipotential type capable of focusing and deflecting charged particles.

It is another object to provide a novel type electron gun in which electrostatic focusing and electrostatic deflection are incorporated in a structure similar to the conventional low voltage electrostatic focus type gun.

It is another object to provide a novel type of electron gun in which electrostatic focusing and electrostatic deflection are incorporated in the main lens of the gun.

It is another object to provide an electron gun in which electrostatic deflection electrodes are provided to operate at a potential low with respect to the primary focusing and accelerating potential applied to other electrodes.

These and other objects are effected by our invention, as will be apparent from the following description taken in accordance with the accompanying drawings throughout which like reference characters indicate like parts, and in which.

Figure 10:
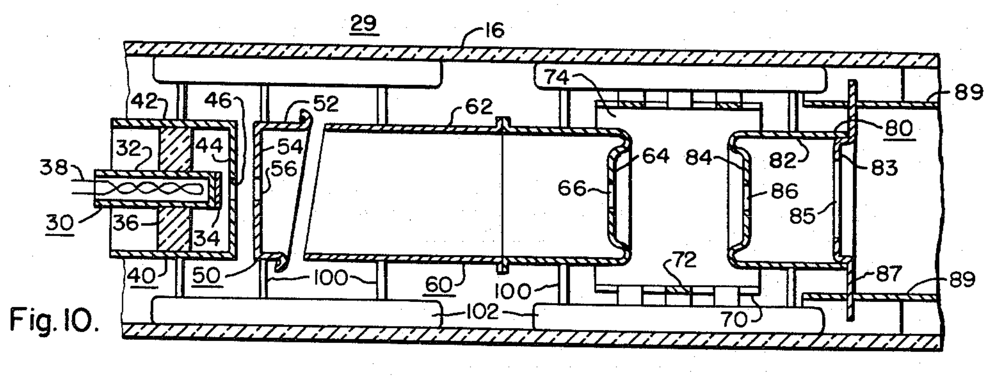
Figs. 10 and 11 are enlarged views of the electron gun structure shown in Fig. 9 embodying our invention.
Figure 11:
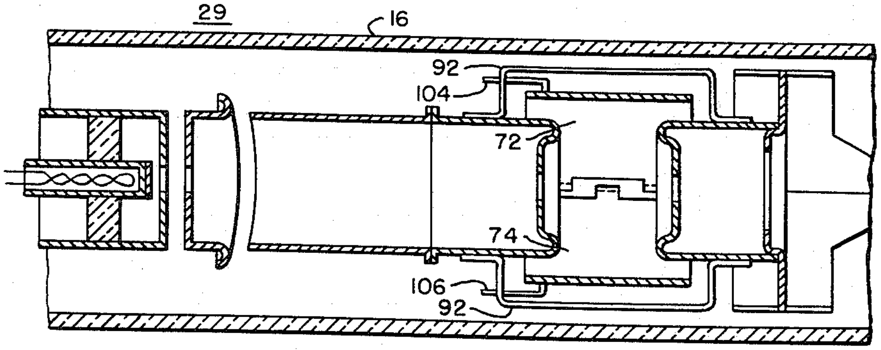
Figure 16:
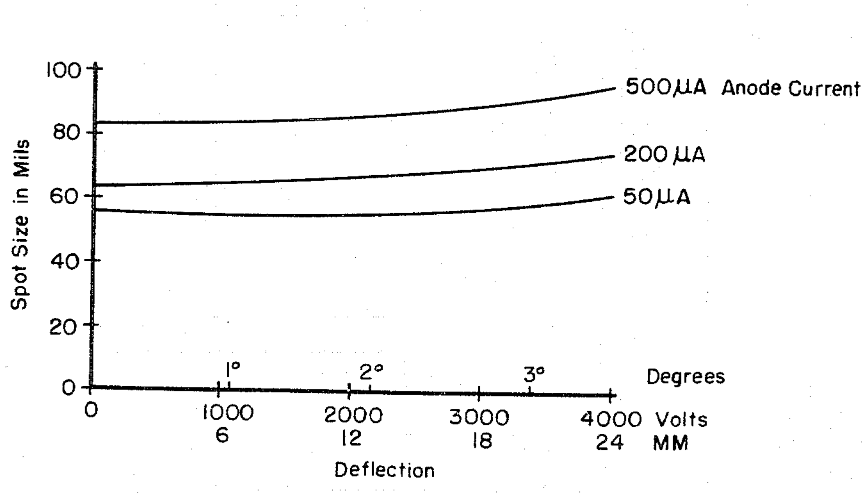
Figure 17:
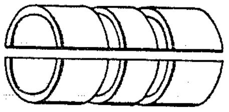
Figures 20, 21:
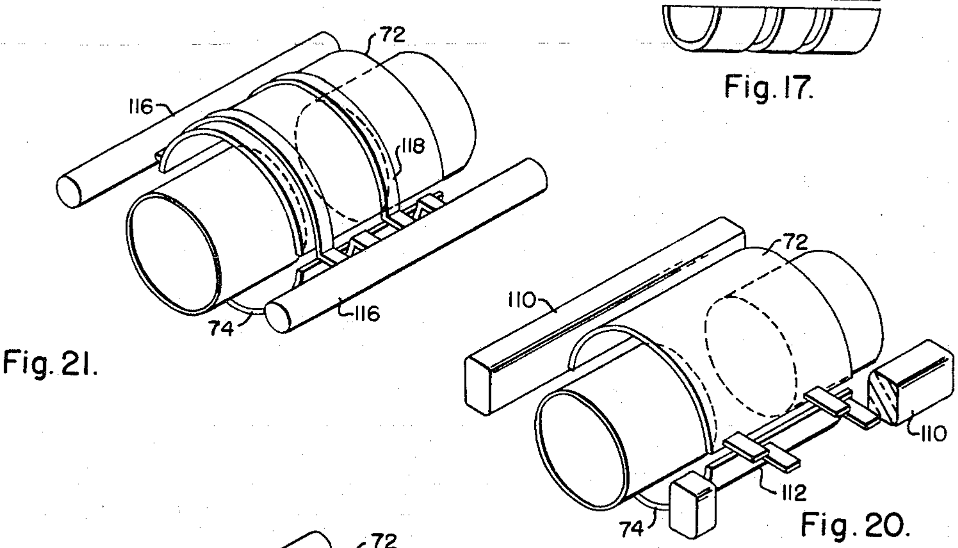
Figure 22:
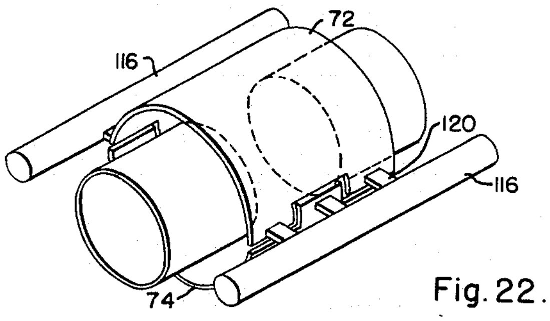
Figure 18:
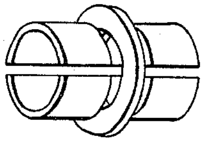
Figure 19:
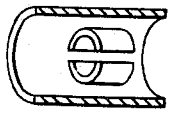

Fig. 16 compares the spot size with respect to deflection voltage for different densities of beam current;

Figs. 17, 18 and 19 illustrate different embodiments of an einzel lens embodying the principles of our invention; and Figs. 20, 21 and 22 illustrate modifications of the lens system shown in Figs. 10 and 11.

Although many of the useful applications of our invention require that it be embodied in a duo-function einzel lens with duo-purpose central electrode, we shall describe its operation in the conceptually simpler case of a bipotential lens with both high and low potential electrodes modified to provide the deflection field as well as the focusing field. In the case where only a short length of each electrode adjacent the lens is used to supply a transverse deflecting field we believe that this also comes within the concept of focusing and deflection within the same space which constitutes our invention. By short we mean less than one diameter.

For purposes of this patent, the focusing region is that in which the field results in radially symmetrical forces acting on the electrons of the beam, so that the radial force component is approximately proportional to the distance from the axis of the structure. By this definition the central ray of the beam is not deflected by the focusing field and the outermost rays of the beam are deflected most toward or away from the central ray. The deflection region is that in which the field causes non-radially symmetrical forces which deflect the central ray and all other rays of the beam approximately equally.

Figures 1, 2, 3:
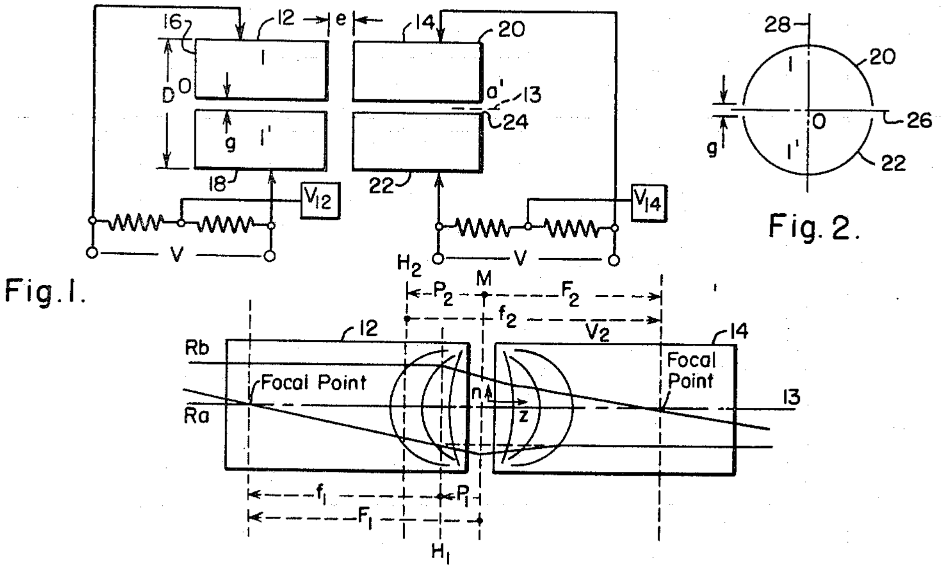
Figure 1 is a schematic view of a bipotential lens embodying our invention.
Fig. 2 is an end view of the electrode system shown in Fig. 1.
Fig. 3 is a view of a bipotential lens to assist in explanation of the invention.

A duo-purpose lens of the bipotential equal diameter cylinder type as shown in Fig. 1, is a typical example of one of the many possible embodiments of our invention. This structure will be described in some detail to illustrate the operation and characteristics of the device. Most of the considerations set forth here with respect to the device shown in Fig. 1 will also apply to the other types of duo-purpose lenses, a few of which will be mentioned and discussed later. The detailed description of the fields in the lens and their action on the electron beam is given for the sake of completeness. We do not intend or wish that our invention be limited by this analysis.

The bipotential lens is a lens which has two different equipotential regions on its two sides as shown in Fig. 3. It is called a direct bipotential lens when the potential of the image space, the right side of lens, is greater than the potential of the object space, the left of the lens in Fig. 3. When the potential of the object space is greater than the image space, then the lens is called an inverted bipotential lens.

In the case of an einzel lens the equipotential regions on both sides of the lens are the same. This type of lens is called also a saddle field lens because of the shape of the equipotentials in the lens region.

Figure 4:
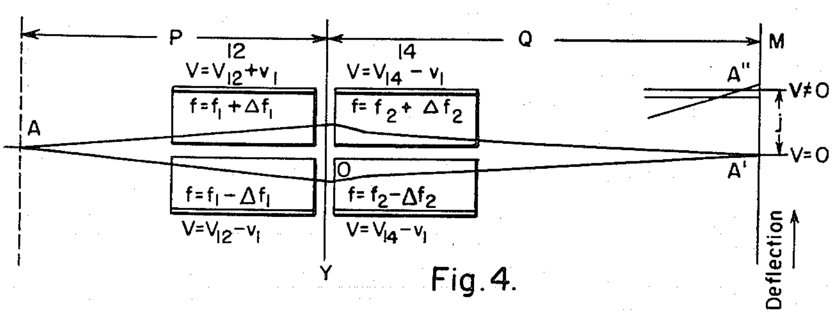
Fig. 4 is a view of a bipotential lens embodying our invention to assist in explanation of our invention.

The duo-purpose lens shown in Figs. 1, 2 and 4 is comprised of two cylinders 12 and 14. The cylinders 12 and 14 form a lens, and are each subdivided along a line parallel to the axis 13 of the two cylinders into parts forming two semi-cylinders 16 and 18 and 20 and 22 respectively arranged symmetrically about the axis 13 of the resulting coaxial structure 12 and 14. The width of the gap 24 between the semi-cylinders 16 and 18 and 20 and 22 will be in general negligible compared with the diameter of cylinders 12 and 14. The length of each of the cylinders 12 and 14 should be less than the diameter of the cylinders 12 and 14.

Two biasing potentials $V_{12}$ and $V_{14}$ are applied respectively to electrodes 12 and 14 to produce a focusing electric field. A balanced potential difference $V=2v_1$ is applied between the semi-cylinder electrodes 16 and 18 and 20 and 22 of each cylinder 12 and 14 to produce a deflecting electric field. The focusing field is essentially a field of rotational symmetry i.e. the equipotential surfaces are surfaces of revolution about the axis 13 of the lens. The deflection field is a field of planar symmetry, i.e. the equipotential surfaces are symmetrical with respect to a plane passing through the axis of the lens orthogonal to the axial plane passing through the center of the gaps. In general the voltages $V_{12}$ and $V_{14}$ are maintained constant while $v$ may be varied arbitrarily. Mechanically, the lens has two axial planes of symmetry 26 and 28 while electrically it has only one plane of symmetry 28 as illustrated in Fig. 2.

The plane 26 will be called the "iso-focal" plane because all rays entering the lens in this plane 26 maintain their focus substantially independently of the deflection voltage $v$. The direction of deflection of the charged particles occurs parallel to the mechanical-electrical plane of symmetry 28.

In the following analysis of the duo-purpose lens we shall first discuss the lens in the operating condition corresponding to a deflection voltage $v=0$; that is, the device is used simply as a focusing lens and there is no deflection. In such a case, the lens performs essentially as a conventional lens between two cylinders 12 and 14 shown in Fig. 3, of the same geometry operating at the same focusing potentials $V_{12}$ and $V_{14}$. The presence of the narrow slots 24 in the cylinders 12 and 14 in Figs. 1, 2 and 4 can effect only in a negligible degree the axially symmetrical configuration of the field, produced by the equivalent conventional lens, in the axial region of the lens which is the portion of lens usually used for imaging purposes. The field distortion in this region caused by the presence of the slots in 12 and 14 approaches zero as the width of the gaps 24 approaches zero.

As is well known from the copious electron optical literature available upon this subject, the equivalent conventional lens shown in Fig. 3 has two focal lengths $f_1$ and $f_2$ which when expressed in units of the diameter D of the electrode cylinders 12, 14 are functions only of the voltage ratio between $V_{14}$ and $V_{12}$. The determination of $f_1$ and $f_2$ requires the knowledge of the potential U existing in the lens. U is ordinarily expressed by means of the well known equipotential line plots obtained by intersecting the equipotential surfaces of axial symmetry, previously mentioned, with any arbitrary axial semiplane or plane. Since the potential U does not depend upon the argument $\theta$ of the semiplane or plane, U can be expressed, as a function of $r$ and $z$ where $r$ and $z$ are respectively the radial and axial cylindrical coordinates of the lens, as shown in Fig. 3. The various parameters and notations $F_1$, $f_2$, $H_1$, $H_2$, $P_1$, $P_2$, etc., appearing in Fig. 3 are well known from electron optics and do not require a detailed explanation here. In Fig. 3, the ratio of $V_{14}$ to $V_{12}$ has been assumed to be larger than unity.

When a transverse deflecting voltage V is applied to both electrodes 12 and 14 of the lens shown in Figs. 1, 2 and 4, the configurations of all the elec-quantities such as potential, field, charge, surface density of charge, etc., lose the character of axial symmetry existing for $v=0$ and acquire one of planar symmetry, as previously mentioned. The axial plane 28 is the plane of electrical symmetry of the lens illustrated in Fig. 5.

Figures 5, 7, 8:
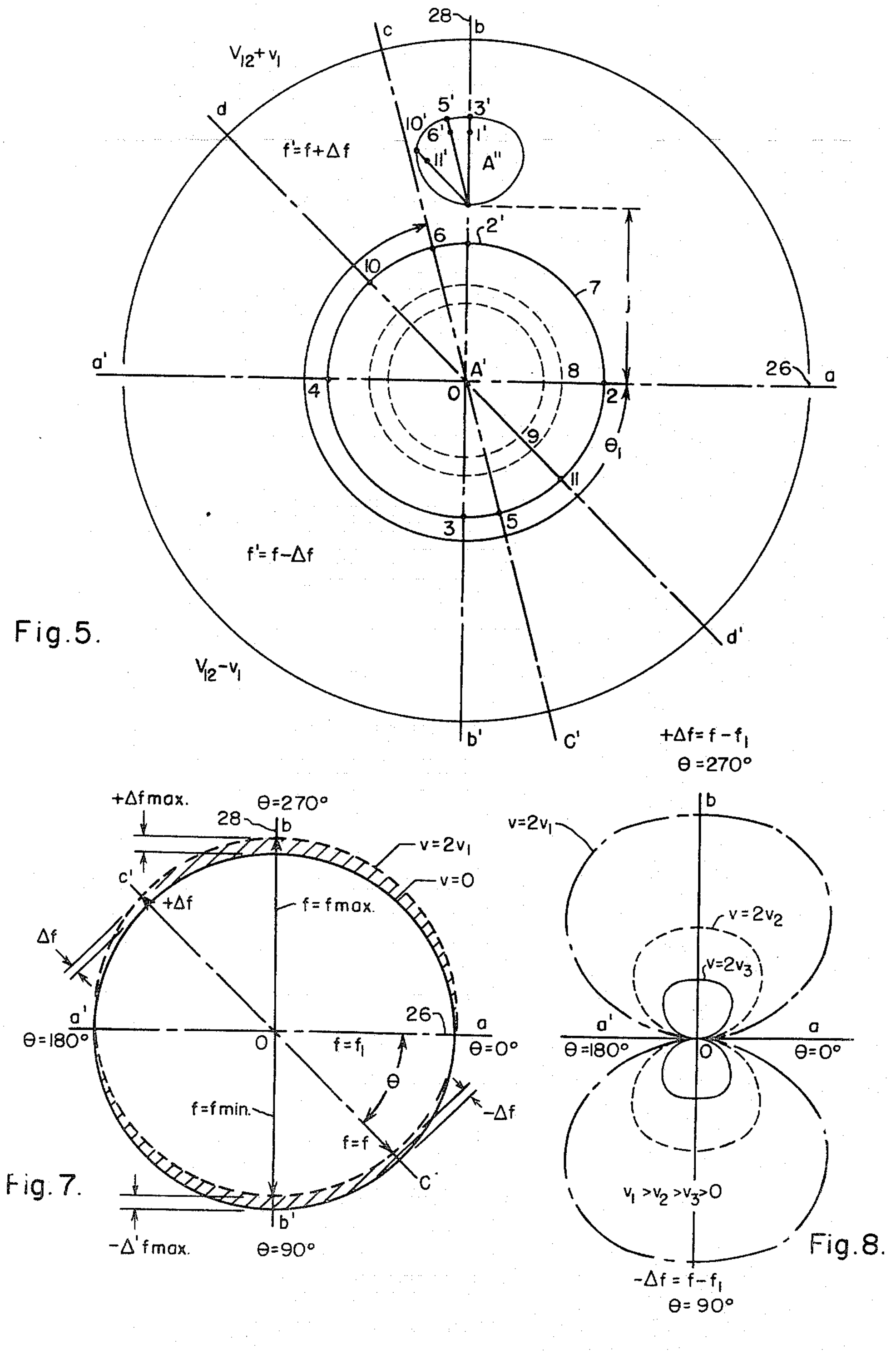

The equipotential line plot obtained by intersection of the equipotential surfaces with an arbitrary axial semiplane C illustrated in Fig. 5, becomes now a function of other variables besides $r$ and $z$; that is, the variables $v$ and $\theta$ where $v=2v$, is the voltage difference between the two portions of the single electrodes which constitute 12, and $\theta$ is the argument of C; that is, the angle between the axial semiplane C and the plane 26. The potential distribution U in semiplanes having supplementary arguments is identical. Among the infinite axial semiplanes of the lens there are two for which the potential configuration U becomes independent of $v$. They are O$a$ and O$a'$, whose arguments are respectively $\theta=0°$ and $\theta=180°$, which form the iso-focal axial plane 26 as shown in Fig. 5. Rigorously speaking, not even plane 26 may be considered as an iso-focal or constant focal strength plane because the electrons entering the lens in the plane 26 do not remain in it throughout the length of the lens, due to the transverse deflection undergone by the electrons. However, under the practical conditions in which the lens will be used, the plane 26 may be considered with good approximation to be an iso-focal plane. Since the strength of a lens increases with increasing voltage ratio $V_{14}/V_{12}$ and since the ratio $V_{14}-v_1/V_{12}-v_1$ is larger than $V_{14}+v_1/V_{12}+v_1$ (see Fig. 4), it necessarily derives for reasons of symmetry and continuity that the rays entering the lens in any axial semiplane C other than O$a$, O$a'$ must be either underfocused or overfocused with respect to those contained in the iso-focal plane 26 of Figs. 4 and 5.

The polarity of $v$ determines which half lens becomes under or overconvergent and the magnitude of $v$ determines the degree of under or overconvergence of the lens. In the case illustrated in Figs. 4 and 5, underfocusing occurs when semiplane C belongs to the upper half and overfocusing when semiplane C belongs to the lower half in which the iso-focal plane 26 splits the lens. The iso-focal plane 26 might also be called the constant potential configuration plane, because it is this latter quantity that is independent, in each point of the plane 26, of the transverse deflecting voltage $v$ applied to the lens. This statement holds only in the specific case in which the transverse deflecting voltage $v$, applied to the two halves of the lens, is a balanced voltage. The term balanced voltage means that the voltage variation $v$ in the upper or lower half of the lens is identical but of opposite polarity to the variation $-v_1$ occurring in the other half. The reference voltage is the biasing voltage $V_{12}$ or $V_{14}$. When unbalanced deflecting voltages are used, no iso-focal or constant potential configuration planes are to be found within the lens.

Because the focal strength of the lens does vary slightly with $v$ for off axis rays in any semiplane not contained in plane 26, the imaging properties of the lens are slightly affected by the application of the transverse deflecting voltage $v=2v_1$ to the lens. This variation of focus is discussed here for the sake of completeness, but the effectiveness of our invention is not limited by the correctness of this explanation nor do we intend to be limited by it. The case of a point object A, lying upon the axis O of the lens, will first be considered, with reference to both Figs. 4 and 5. For $v=0$, the lens has a well determined strength and the object A will be focused in a point image A′ lying upon the image plane M and the axis O. The lens has been assumed to be aberration free.

For $v=0$, the image A″ is displaced away from the axis O by a quantity $j$ proportional to the voltage $v$; furthermore, A″ has a finite area. In order to predict the qualitative appearance of A″ let us consider the rays contained in the iso-focal plane O$a$ or 26 and in the deflection plane O$b$ or 28. The circle 7 in Fig. 5 represents the cross section of the beam at the entrance side of the lens. All the rays contained in the axial semiplane O$a$, between the axial ray 0 and the outermost or boundary ray 2 on the circle 7 are focused in a single point 2′ because the strength of the lens in the iso-focal plane does not depend upon the trajectory of the rays through the lens nor upon $v$. On the point 2′ are focused also, for the same reasons, all the rays contained in the axial semiplane O$a'$ comprised between the axial ray 0 and the boundary ray 4 on the circle 7. Thus, in first approximation, all the rays contained in the iso-focal plane 26 are focused in the single point 2′ in Fig. 5. This is not exactly true since: ($a$) The transverse deflecting field is not uniform over the iso-focal plane and therefore the amount of deflection undergone by the various electrons will not be the same; ($b$) the rays do not remain in the iso-focal plane throughout the entire lens.

Considering now the rays contained in the deflection semiplane O$b$, these rays are all underfocused, in a degree which increases going from the position occupied by the axial ray 0 to the position occupied by the outermost or boundary ray 1 on circle 7. Therefore, if 1′ is the point in which the most underfocused ray 1 intercepts the image plane M, all other rays, for reasons of continuity, are spread along a segment 1′—2′ belonging to the O$b$ line, interception of the O$b$ plane with the image plane M.

Similarly, the overfocused rays contained in the O$b'$ semiplane determine a segment 3′—2′ upon the line passing through O$b'$.

Thus, all the rays belonging to the axial plane O$b$ are imaged in a segment 3′—2′ resulting in the upper position of the two segments 3′—2′ and 1′—2′ just described. Similar considerations may be repeated for any other axial plane O$c$, O$d$, etc., of the lens. The rays belonging to each axial plane will furnish a segment 5′—2′, 10′—2′, etc., as the image of the point object A, the length of each segment becoming shorter as the axial plane's angle $\theta$ with the iso-focal plane $a$ becomes smaller. The loci of all these variable length segments, having a common extremity in 2′, is the image A″ of A. The image A″ is symmetrical with respect to the deflection plane O$b$.

Figure 6:
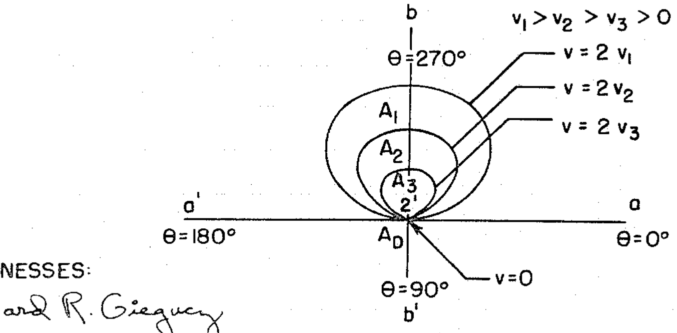
Figs. 5, 6, 7 and 8 are figures to assist in the explanation of our invention.

For a reversed polarity $v$, one obtains a similar image A″ on the opposite side of the iso-focal plane 26, always with its vertex 2′ directed towards the axis O of the lens. For different transversal deflecting voltages $v$, different images A1, A2, A3, A0, of the point object A are obtained as shown in Fig. 6. The vertex 2′ of all the images A1, A2, etc. have been superimposed in the representation of Fig. 6.

If one considers now the case of an object A constituted by a small spot as found for instance in electron guns for television or oscillographic purposes, it would not be difficult to show that the deflected image corresponding to said spot would be similar to the one found in the point object case just discussed and would have a size several times smaller than the size indicated by the dotted circles 8 and 9 that it would respectively possess if the conventional equivalent lens were all uniformly over or underfocused in the degree experienced by the boundary rays lying in the deflection plane $b$.

It should be emphasized that while experimental tests show a type of spot distortion like that which we have predicted, the amount of defocusing is negligible for the deflections required in many applications.

Figs. 7 and 8 illustrate the spread of focal lengths assumed by the first focal length $f_1$ of the lens in correspondence of the various axial semiplanes, for a given set of conditions. The spread is represented by the shaded area of Fig. 7 or by the areas inside the various curves of Fig. 8. It is zero for $v=0$ and increases with increasing $v$, all other conditions remaining constant. The order of magnitude of the maximum deviation $\Delta f$ of the focal length $f$ from the value $f_1$, is $$\Delta f=\frac{1}{2}f_1\frac{v_1}{V_{12}}$$

where $v_1$ and $V_{12}$ have the meaning apparent from Fig. 3.

Similarly the variation $\Delta f$ of the second focal length $f_2$ may be expressed as $$\Delta f<\frac{1}{2}\cdot f_2\frac{v_1}{V_{14}}$$

The considerations so far made concerning the equal diameter bipotential lens can be easily extended also to the bipotential lenses with cylinders of different diameter. Furthermore, they are valid also in the cases when the balanced voltage $v=2v_1$ applied across the electrode 12 of the lens is different from the voltage $v=2v_2$ applied across the other electrode 14 of the lens.

The above-mentioned considerations hold also for electron optical focusing and deflection systems of configuration other than the one of axially symmetrical symmetry chosen for the illustration of this invention.

Although for the sake of simplicity, the analysis of the operation of the invention was made for a bipotential lens, the application of the principle of focusing and deflecting a beam of charged particles in the same space to an einzel lens is particularly attractive. The important ones are freedom to adjust the potential of the duo-purpose focusing and deflecting electrodes to any potential near cathode potential, and to simplify the structure of the lens, the structure of the tube into which it is incorporated and the associated circuits. For this reason, we shall describe our invention as embodied in an einzel lens and incorporated in a cathode-ray tube such as may be used for television display purposes. Because of the importance of this application, certain performance factors of the duo-purpose einzel lens will be given for its use in this type of tube. This data illustrates the excellent performance of the lens in which focusing and deflection occur in one space but it not intended to limit use of such a lens to a particular gun structure or tube type. Electron guns having a principal lens of the bipotential type have also been built with excellent results.

Figure 9:
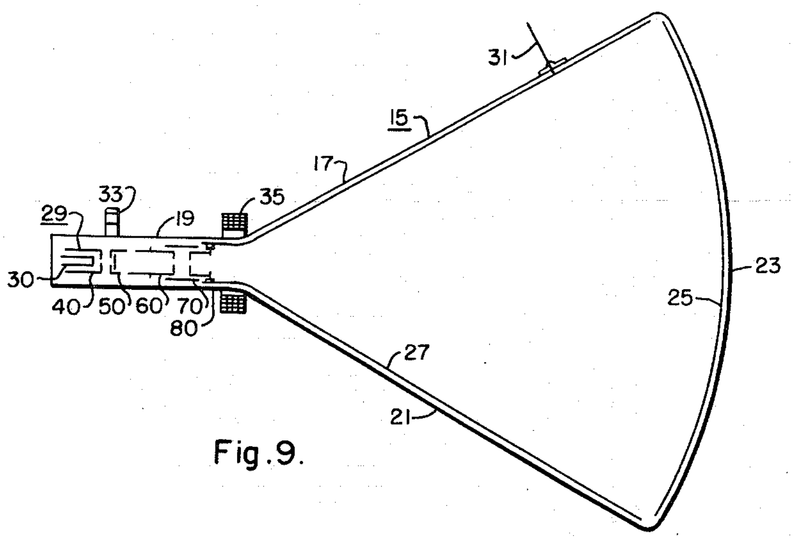
Fig. 9 is a view of a cathode ray tube embodying our invention.

Referring in detail to Fig. 9, there is shown a cathode ray tube embodying our invention. The tube is comprised of an envelope 15 of conventional type having a funnel portion 17, which includes a neck portion 19 and a flared bulb portion 21. The large end of the flared bulb portion is closed by a transparent face plate member 23. The face plate member 23 of the envelope 15 has a fluorescent coating 25 on the inside surface thereof and the flared bulb portion 21 has a conductive coating 27 of a suitable material such as colloidal graphite suspension or a thin metallic film. An electron gun 29 is mounted inside of the neck portion 19 of the envelope 15.

The electron gun 29 is comprised of an indirectly heated cathode 30, a control grid or electrode 40, a screen grid or electrode 50, a first anode 60, a focusing and deflection electrode 70 and a second anode 80 in the order named. Electrodes 60 and 80 are normally operated at the full accelerating potential of the tube. The conductive coating 27 on the interior of the bulb funnel portion 15 is at the same potential as the second anode of the gun and a suitable voltage is applied to it at the terminal 31. The structure of the electron gun 29, as shown and described, is of the type known as a low voltage electrostatic focus type cathode ray gun. Positioned on the exterior of the neck portion 19 of the envelope 15 may be an ion trap magnet 33, if an ion trap type structure is used, and an electromagnetic deflection system represented by the coil 35.

Referring in detail to Figs. 10 and 11 for a more detailed description of the electron gun 29, the control grid 40 is comprised of a tubular member or skirt 42 with a diaphragm or stop 44 positioned therein, in which a small aperture 46 is centrally located substantially on the axis of the electron gun 29. In the specific embodiment shown, the diaphragm 44 is located at the end of the tubular member 42 nearest the screen 25. The plane of the diaphragm 44 is perpendicular to the axis of the electron gun 29. Positioned within the control grid structure is a cathode 30 comprised of a tubular member 32 of a smaller diameter than the control grid skirt 42 and coaxial with respect thereto. The end of the tubular member 32 nearest the diaphragm 44 of the control grid 40 is closed and a coating 34 of suitable electron emissive material such as barium and strontium carbonate, later converted into oxides, is placed on its exterior surface. The tubular member 32 is supported by any suitable means, such as a ceramic collar 36. A heater 38 is provided within the tubular member 32 to provide the proper temperature for the operation of the electron emissive coating 34.

The screen grid or electrode 50 is comprised of a tubular skirt or cylindrical member 52, spaced along the axis of the gun and adjacent to the diaphragm end of the control grid 40. The screen skirt 52 also has a diaphragm 54 positioned therein and which in the specific embodiment closes the end of the skirt 52 adjacent to the control grid 40 and is perpendicular to the axis of the electron gun 29. In a similar manner to the control grid diaphragm 44, an aperture 56 is placed at the center of the diaphragm 54. The plane of the unclosed end or rim of the skirt 52 may be slanted ordinarily at an angle of 10° to 13° with respect to a plane perpendicular to the axis of the gun, if ion trapping action is desired.

The screen grid 50, as generally described above, is more completely described in a United States Patent 2,773,212, issued December 4, 1956, entitled "Electron Gun," by J. A. Hall and assigned to the same assignee. The structure described above, including the electron emissive surface 34, the control grid 40 and the screen grid 50 make up what is generally referred to as the beam forming electrode structure of the electron gun 29.

This structure may be modified in several ways from that described above. The general object of the beam forming electrodes is to form a cross-over of the electrons emitted from the electron emissive surface 34, in addition to modulating the intensity of the electron beam which may then be focused on the fluorescent screen by means of a suitable focusing system.

The focusing system in the electrostatic type gun, illustrated in Figs. 10 and 11, consists of the first anode 60, the focusing electrode 70 and the second anode 80. The focusing system also incorporates the function of providing small amplitude deflection. The first anode 60 is comprised of a cylindrical or skirt member 62 spaced along the axis of the gun and adjacent to open end or rim of the screen grid 50. The first anode 60 is open at the end adjacent the screen grid 50 and the rim adjacent thereto may also be slanted so that the plane of the rim is parallel to the plane of the rim of the screen grid 50, if ion trapping action is desired. The other end of the first anode skirt 62 is closed by a diaphragm 64 perpendicular to the axis of the gun and also having a centrally located aperture 66 therein.

The second anode 80 is comprised of a cylindrical or skirt portion 82 positioned along the axis of the gun 29 from the first anode 60. The end of the skirt 82, adjacent the first anode 60, is closed by a diaphragm 84 perpendicular to the axis of the gun and also having a centrally located aperture 86 therein. These diaphragms may be flat or specially shaped, perhaps recessed, to shape the field. The opposite end of the second anode 80 may also have a diaphragm 83 therein perpendicular to the gun axis and with a large central aperture 85 positioned therein. Integral with the diaphragm 83 is a flange 87 extending outwardly from the second anode skirt 82. Flexible spring members 89 are attached to the flange 87 for aiding in positioning the electron gun 29 within the neck 19 and also make electrical contact with the conductive coating 27 on the flared portion 21 of the envelope 15. The first and second anodes 60 and 80 are connected together electrically by means of the two conductive support leads 92 and are supplied with the same voltage by means of the flexible spring members 89 contacting the conductive coating 27.

Figure 12:
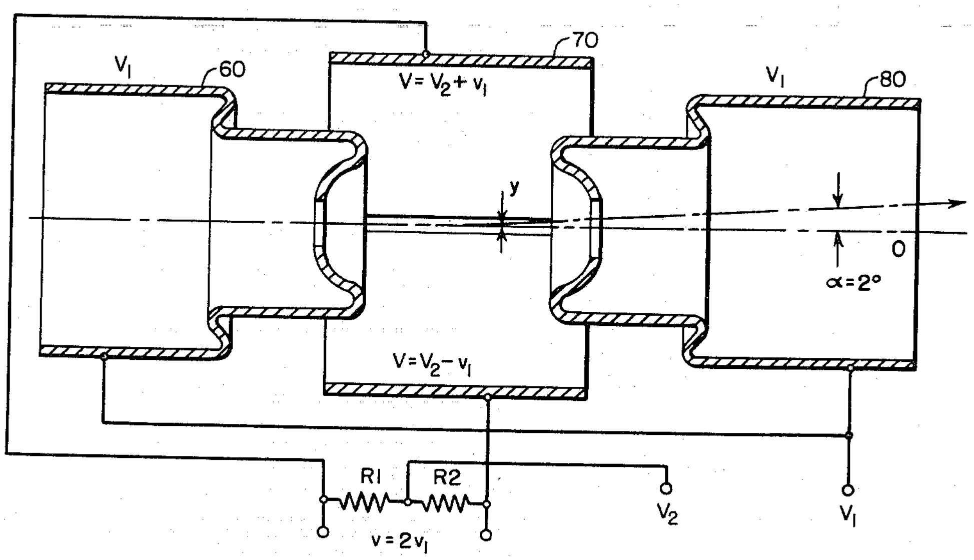
Fig. 12 is a schematic view of an einzel type lens embodying the teachings of our invention.

The focusing electrode 70 is a tubular electrode consisting of at least two sections 72 and 74 positioned around the axis of the gun and surrounding the space between the first and second anodes and co-axial with the axis of the gun. The diameter of the focusing electrode 70 is larger than that of the first and second anodes. In some applications, it may be desirable to provide reduced end cups on the first and second anodes 60 and 80 adjacent the focusing electrode as illustrated in Fig. 12.

The control grid 40, the screen grid 50 and a portion of the first anode 60 are supported and secured by means of radially extending anchor pins 100 provided on the cylindrical surfaces thereof and embedded within longitudinal glass support rods 102 extending along the gun structure. The focusing electrode system, including the first and second anodes 60 and 80 and the focusing electrode 70, is also supported in a similar manner. Suitable voltages are provided by leads extending through the button stem provided in the end of the tube neck to the heater 38, cathode 30, control grid 40, screen grid 50. Two leads 104 and 106 are provided for the focusing electrode 70. They are respectively connected to the elements 72 and 74 which form the focusing electrode 70.

In the operation of the electron gun structure, the electrons are emitted from the electron emitting surface 34 of the cathode 30 and the electrostatic field between the control grid 40 and the screen grid 50 accelerates the electrons and forms a lens of short focal length. This electrode system forms the electrons into what is known as a cross-over within the screen grid region. The control grid 40 controls essentially the number of electrons passing through the aperture 46 in the diaphragm 44 and thereby, by means of modulation thereto or in combination with the cathode 30, controls the intensity of the electron beam. The electron beam thus formed passes through the aperture 56 in the diaphragm 54 of the screen grid 50, and is accelerated to full anode potential as it passes into the first anode 60. If desired, an ion trap structure may be utilized at this point for removal of ions from the beam. It is also possible to provide a suitable coating on the fluorescent screen 25, in which event the electron gun may not incorporate an ion trapping system.

The electron beam thus formed, enters into the focusing lens or principal lens of the electron gun structure. The lens structure illustrated in Figs. 10, 11 and 12 is of the basic type known as an einzel or unipotential lens.

In order to fully appreciate the gun equipped with a principal lens of the duo-purpose einzel type, it is necessary to note certain facts concerning the einzel lens. The name is derived from the fact that the two external electrodes of the lens, which is usually composed of three electrodes, are at the same potential. The lens is thus surrounded by a media of the same refractive index on both sides and corresponds to an "isolated" or einzel glass lens. When the middle electrode of the einzel lens is held at a potential substantially equal to zero, the lens is called a unipotential lens because only the single potential supplied to the external electrodes is required for operation. In such a case the focal length of the unipotential lens becomes independent of the potential on the external electrodes and, therefore, potential fluctuations in the supply do not affect the beam focus in the tube using such a lens. This feature is of such practical importance that almost all the picture tubes produced in this country with electrostatic focus for television service are provided with a principal lens of the einzel type. The electron guns built into these picture tubes customarily operate with the first and second anodes 60 and 80 of the einzel lens at a potential of about 12 to 20 kilovolts and the focusing cylinder 70 at about 0 to 400 volts positive with respect to the cathode 30.

The above description has been primarily directed to the focusing action of the unipotential or einzel lens electrode system. By making the focusing electrode 70 a bi-element electrode formed by two semi-cylindrical members 72 and 74, electrically isolated from each other, a duo-purpose electron optical lens like the one in Figs. 9, 10 and 11 is obtained. Such an electron optic focusing and deflection system will behave essentially as described in the previous case of the duo-purpose equal-diameter cylinder bipotential lens.

Figure 13:
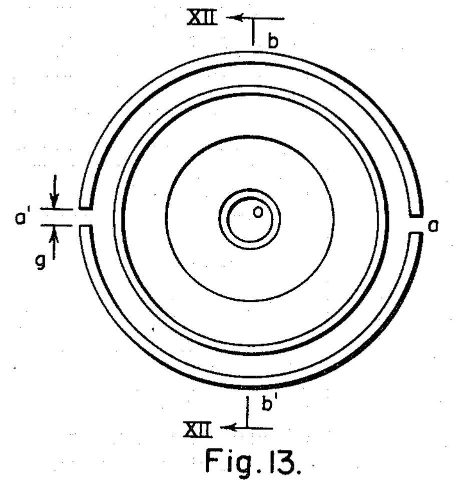
Fig. 13 is an end view of the electrode system shown in Fig. 12.

Referring in detail to Fig. 13, the mechanical-electrical plane of symmetry of the lens is the axial plane O*b*. The plane of constant focal length, or iso-focal plane, is the plane O*a* orthogonal to O*b*. The deflection of the charged particles occurs parallel to plane *b*. In the lens structure of Fig. 12, the balanced voltage $v=2v_1$ is shown applied only to the central electrode of the lens, usually biased at 0 to 400 volts, rather than to all three electrodes. This is done to circumvent the severe insulation problems involved with the 12–20 kilovolts high voltage applied to the external electrodes of the lens.

The amount of deflection $y$ which the beam undergoes within the lens region is very small for the amplitude of deflection which the device will be called to provide for most applications as apparent from Fig. 12. It is negligible compared to the diameter of the beam inside the lens region. The slight deviation $y$ of the beam's axis from the lens' axis results in a defocusing effect of second order importance.

The large size focusing electrode minimizes also the defocusing effect caused by the non-uniformity of the transverse deflecting field in the lens region occupied by the beam. Further enlargement of the focusing electrode diameter or the use of smaller diameter beams would still further decrease the defocusing due to this latter cause. The width of the gap $g$ was .012 inch in the embodiment of Figs. 10, 11 and 12, while the diameter of the focusing electrode was about .625 inch.

Figure 15:
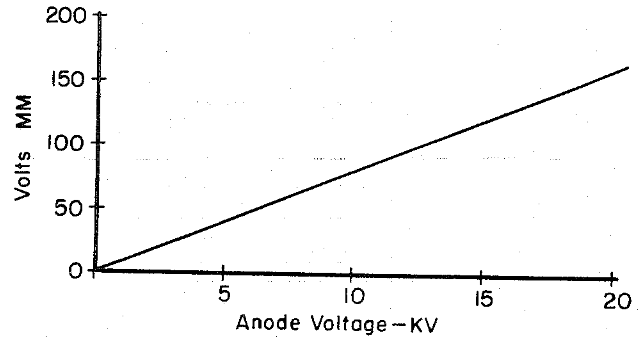
Fig. 15 shows a comparison between the anode voltage and the deflection voltage.
Figure 14:
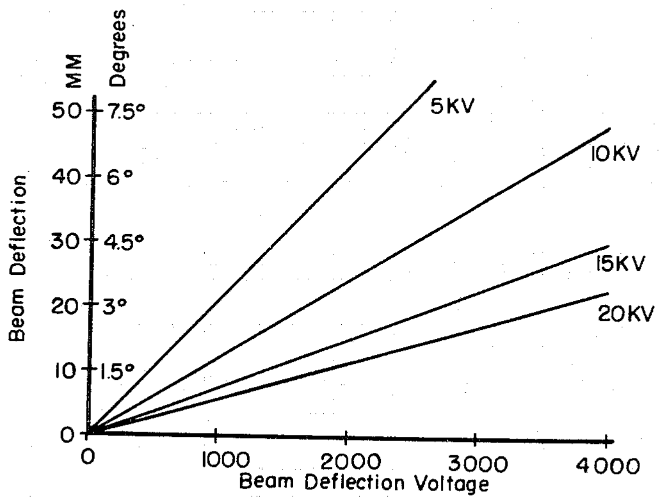
Fig. 14 is a graph showing the relation between the beam deflection distance with respect to the beam deflection voltage.

Data concerning the performance of a duo-purpose lens like the one shown in Fig. 12 is presented in the various graphs of Figs. 14, 15 and 16. The lens was mounted in a gun, similar to the one illustrated in Figs. 9, 10 and 11. This gun was built into a 21 inch picture tube of the 90 degrees deflection type. The beam deflection versus beam deflection voltage is given in Fig. 14 for various values of the anode voltage. The relationship between these two quantities appears to be practically linear for each value of anode voltage.

The curve in Fig. 15 represents the spot deflection plotted versus anode voltage. Here also the linearity of the relationship appears quite evident. The deflection factor, or volts per degree of deflection per kilovolt of anode voltage, of the lens was found to be 56 volts/degree/kilovolt in the embodiment cited.

The curves shown in Fig. 16 represent spot size versus deflection voltage (and also versus degrees or millimeters of deflection) with beam current as parameter. The graph shows that the spot size is unaffected by the deflection of the beam within the lens, for an amplitude of deflection up to about one degree, which corresponds to a deflection of 6 millimeters upon the screen in this embodiment. For larger amplitude deflections, the spot size is still almost unchanged up to about 2 degrees which corresponds to a deflection of about 13 millimeters upon the screen in this embodiment.

For still greater deflection, up to and beyond 3 degrees, the spot size is not excessively distorted. Spot size was measured across the spot diameter between points in which the spot brightness level had fallen practically to zero.

In television service the picture quality produced by the gun equipped with the novel duo-purpose lens was excellent. The picture resolution was unappreciably degraded when the whole picture raster was shifted a quarter of an inch by applying a balanced 1.2 kilovolt deflecting voltage across the focusing electrode of the lens, whose bias has been adjusted for best focus in the absence of the deflection voltage. Duo-purpose lenses of the bipotential type have also shown excellent results.

The structure shown in Figs. 9, 10, 11 and 12 illustrates the extreme structural simplicity due to the absence of the conventional deflection plates positioned between the gun and the screen. Another feature of the invention is the fact that the connecting leads for the deflecting electrodes are brought out through the button stem at the base of the tube instead of the neck or the wall of the cathode ray tube as in previous devices.

There are obviously many variations of the duo-purpose einzel lens so far described. All three electrodes of the lens may be multielement, as illustrated in Fig. 17, or both the external electrodes may be multielement, as illustrated in Fig. 18. Fig. 19 illustrates another structure in which only the middle electrode is multielement. The lens can be a combination of cylindrical electrodes, cylinders and cups, diaphragm electrodes or diaphragms and cups, in which one or more electrodes could be multielement. Each electrode may be divided into two or more elements, for cases in which one or more independent deflections in the focusing regions are desired. The basic idea of the multielement einzel lens is not limited to these structures or the coaxial symmetry, but applies also to other configurations. The planes of deflection of the various multielement electrodes may be oriented parallel to each other or at an angle. In general, it is advantageous for certain applications to use lens structures in which the low voltage element is utilized as the multielement electrode. This will provide increased beam deflection sensitivity because in correspondence of the low voltage electrode, the beams are more easily deflected; also low voltage deflection electrodes are preferable because of insulation problems which may become particularly serious above 5 kilovolts operating voltages.

Referring in detail to Figs. 20, 21 and 22, there is illustrated some typical embodiments of practical structures for use with the new duo-purpose electron optical lenses, and in particular, the new multielement einzel lens of the typical cup and cylinder type. Figs. 10 and 11 show the preferred structure in which only the glass beads 102 supply the required rigidity. The support lugs 100 of the focus electrode 70 are mounted and embedded in electrically insulating support beads, such as glass. The half plates 72 and 74 are identical parts with integral support lugs, which may be made as relatively simple stampings. In addition, the support lugs 100 are precise enough to serve as a means for locating and holding the parts during the beading operation. When the lugs 100 are aligned, as shown, the spacing between the edges of the half plates 72 and 74 will be automatically obtained and will be maintained by the glass beads 102. Edge to edge alignment of the half plates 72 and 74 will also be inherently maintained in this construction. Once the glass support beads 102 have been applied, the einzel lens assembly will be a rigid unit in which each glass bead 102 holds every part in place and in correct relation to all the other parts of the focusing system.

In Fig. 20, a modified structure is shown in which wide multiform glass beads 110 are used so that the wire studs or beam straps 112 from both semi-cylinders 72 and 74 may be embedded in each bead. The studs 112 are welded near the edges of the semi-cylinders 72 and 74 and are preferably staggered to improve the electrical insulation between the two parts.

Fig. 21 uses a standard diameter glass bead 116 with specially formed wire studs or beading straps 118 which are embedded in the bead 116 in line with the gap between the two semi-cyclinders 72 and 74. The studs 118 are again staggered for insulation reasons. In Fig. 22 the semi-cyclinders 72 and 74 have notched edges so that straight wire studs or 180° beading straps 120 may be used and embedded in one straight bead 116 of standard thickness. The edges may be of any form and are not critical.

The structures shown and described herein are capable of providing an electrode system which is capable of both electrostatic focusing of an electron beam and also small amplitude electrostatic deflections of the beam in the same space by means of deflection electrodes operating at a low potential.

While we have shown our invention in several forms, it will be obvious to those skilled in the art that it is not so limited but is susceptible to variations and changes and modifications without departing from the spirit and scope thereof.

We claim as our invention:

1. An electron discharge device comprising an electron gun for producing an electron beam, a target member for intercepting said electron beam, said electron gun comprising a beam forming electrode system, and a focusing electrode system, said focusing system comprising a plurality of tubular focusing electrodes, one of said focusing electrodes split along its length to provide two electrical separate arcuate electrode members for providing a field transverse to said electron beam path in response to a voltage differential applied thereto in the focusing region of the focusing system.

2. A lens system for focusing and deflecting a beam of charged particles, said system comprising a plurality of focusing electrode members having openings therein for the passage of said beam of said particles, means for supplying potential to said electrode member whereby the entrance and exit portion of said lens system are at substantially the same potential, one of said focusing electrode members comprising at least two electrical separate arcuate portions about said beam path, and means for applying a difference of potential between said portions to deflect said particle beam.

3. A lens system for focusing and deflecting a beam of charged particles comprising a plurality of electrode members having openings therein for the passage of said particle beam, means for supplying potential to said electrodes to provide substantially the same potential at the entrance and exit portions of said lens system, one of said electrode members intermediate to entrance and exit portion at a different potential with respect to said entrance and exit portion of said lens to provide a focusing field, said intermediate electrode broken into at least two separate electrical arcuate portions positioned about said beam path, and means for applying a differential of potential between said portions to deflect said beam.

4. A lens system for focusing and deflecting a beam of charged particles, said system comprising a plurality of tubular electrode members, said system including an input and an output electrode held at substantially the same potential, an electrode positioned intermediate of said input and output electrode for providing a focusing field, said intermediate electrode comprised of at least two separate electrical arcuate portions, and means for applying a difference of potential between said portions to deflect said beam.

5. A lens system for focusing and deflecting a beam of charged particles, said system comprising three tubular electrode means positioned along a common axis, means for providing potential of substantially the same value to the exterior electrodes of said system, and means for applying a potential to the intermediate electrode means of said system intermediate the potential of said exterior electrodes and the source of said charged particles, said intermediate electrode means comprised of at least two separate electrical arcuate portions, and means for applying a difference of potential between said portions to deflect said particle beam.

6. A particle beam gun comprising a source of charged particles and a plurality of electrodes for focusing and deflecting said particles into a beam, said electrodes positioned along a common axis to provide at least three separate spaced electrode means, means for applying a potential to the near electrode and the remote electrode with respect to the source of charged particles to accelerate the particles from said source and of substantially the same value, the intermediate electrode comprised of at least two electrical separate portions and means for applying a biasing voltage to said intermediate electrode to focus the beam on a given plane, and means for applying a voltage difference between said electrical separate portions of said intermediate electrode which is balanced with respect to said bias voltage to deflect said particle beam.

7. A cathode ray tube comprising an electron gun for generating an electron beam, a target member for intercepting said electron beam, said electron gun comprising a beam forming an electrode system and a focusing and deflection electrode system, said focusing system of the bipotential type comprised of two separate electrode members through which said electron beam passes, means for supplying a potential difference between said electrodes to provide a focussing field between and within said electrodes, said electrodes comprised of two electrical separate arcuate portions about said beam path to provide a deflection field within the same region as said focusing field.

8. A cathode ray tube comprising an electron gun for generating an electron beam, a target member for intercepting said electron beam, said electron gun comprising a beam forming an electrode system and a focusing and deflection electrode system, said focusing system of the einzel lens type comprised of three separate electrode members through which said electron beam passes, means for supplying a given potential to the exterior electrode members of said einzel lens and a substantially different potential to the intermediate electrode member of said einzel lens system to provide a focusing field within the region between said exterior electrodes, said intermediate electrode comprised of at least two electrical separate electrode portions about said beam path to provide a small amplitude deflection field within the same region as said focusing field.

9. A cathode ray tube comprising an electron gun for generating an electron beam, a target member for intercepting said electron beam, means provided for deflecting said electron beam to scan a raster over said target member, said electron gun comprising a beam forming electrode system and a focusing and deflection electrode system, said focusing system comprised of two spaced tubular electrodes through which said electron beam passes, said electrodes having a length less than the diameter of said electrode members, means for supplying a potential difference between said electrodes to provide a focusing field within the region surrounded by said electrodes, said electrodes comprised of two electrical separate arcuate portions about said beam path to provide a small amplitude deflection field within the same region as said focusing field.

10. A cathode ray tube comprising an envelope and having therein an electron gun for generating an electron beam, a target member for intercepting said electron beam, means provided on the exterior portion of said envelope for deflecting said electron beam to scan a raster on said target, said electron gun comprising a beam forming electrode system and a focusing electrode system, said focusing system providing a focusing field within a predetermined region of said electrode system, said focusing system comprised of at least two electrical separate electrode portions about said beam path to provide in addition to focusing a small amplitude deflection field within the same region as said focusing field.

References Cited in the file of this patent

UNITED STATES PATENTS

| | | |
|---|---|---|
| 2,226,107 | Schlesinger | Dec. 24, 1940 |
| 2,719,243 | Hoagland | Sept. 27, 1955 |
| 2,773,212 | Hall | Dec. 4, 1956 |